May 15, 1928. 1,669,828
J. H. HARLEY
AUTOMATIC AIR STABILIZER
Filed July 22, 1925
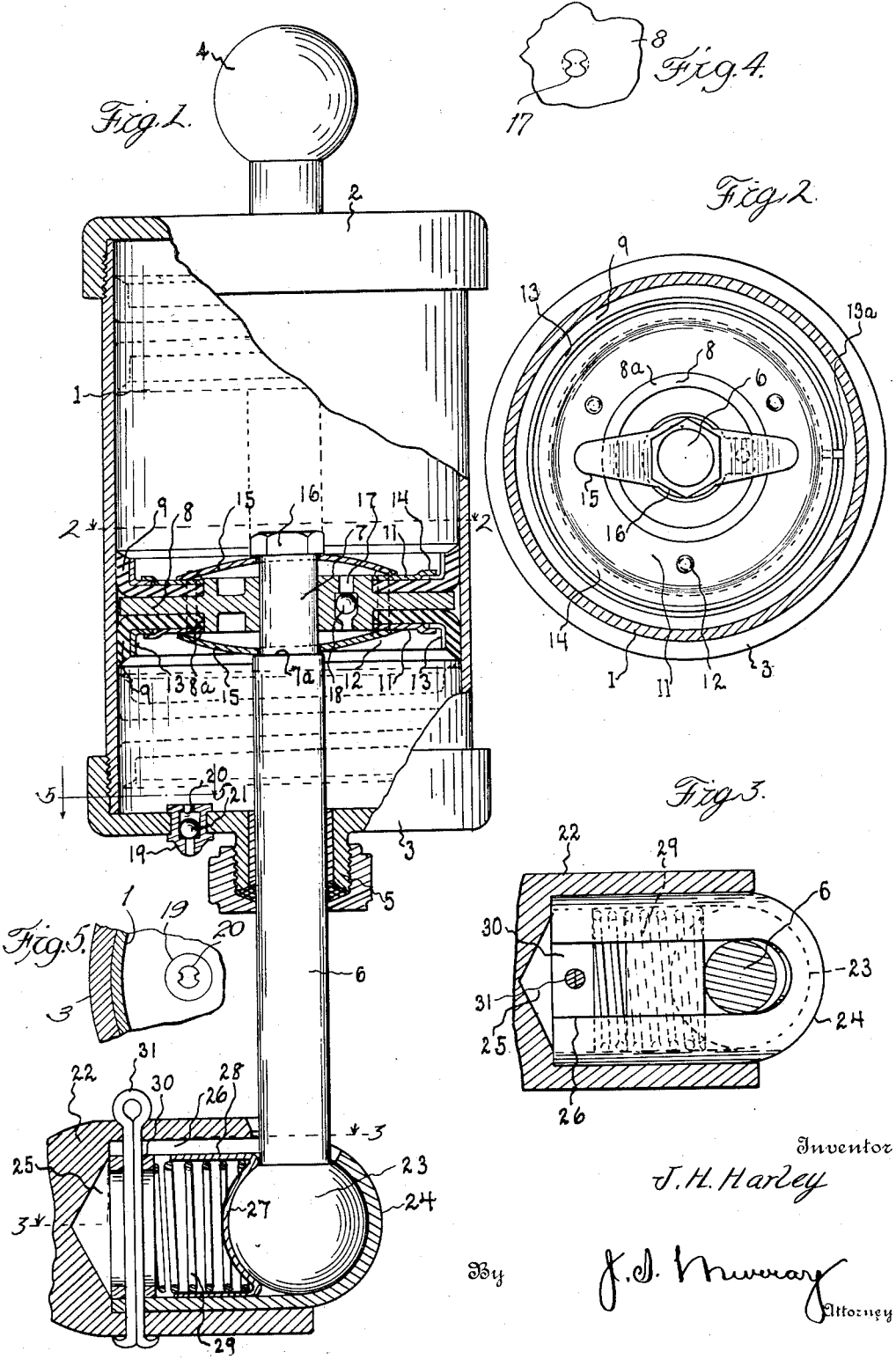
Inventor
J. H. Harley
By J. S. Murray
Attorney Patented May 15, 1928.

1,669,828

UNITED STATES PATENT OFFICE.

JOHN HARRY HARLEY, OF DETROIT, MICHIGAN.

AUTOMATIC AIR STABILIZER.

REISSUED

Application filed July 22, 1925. Serial No. 45,295.

This invention relates to stabilizers, such as are employed primarily upon vehicles (and more particularly upon motor vehicles) to supplement springs mounting the bodies of such vehicles upon the chassis thereof, serving to absorb shocks incident to the operation of such springs and particularly serving to absorb the shocks arising from the rebound of such springs.

It is an object of the invention to provide an improved stabilizer in which air serves as the shock absorbing medium.

More specifically, it is an object to provide an automatic air stabilizer, comprising a piston movable in a cylinder to absorb shocks by air compression in said cylinder, and to provide an improved control for the flow of air into and out of said cylinder and from one side to the other of said piston.

Another object is to provide an improved construction of composite piston for use in a stabilizer of the above mentioned character.

Still another object is to provide an improved anchorage member for the piston rod of an air type of stabilizer, comprising a novel universal joint.

These and various other objects, the invention attains by the construction hereinafter described and illustrated in the accompanying drawing, wherein:

Fig. 1 is a vertical sectional view of the improved stabilizer.

Fig. 2 is a cross sectional view of the same taken upon the line 2—2 of Fig. 1.

Fig. 3 is a cross section taken upon line 3—3 of Fig. 1 and disclosing primarily the universal joint connecting the piston rod of the stabilizer to an anchorage member for said rod.

Figure 4 is a fragmentary bottom view of the piston showing a valved port therein and a provision at the lower end of said port retaining a valve in the port without restricting the port.

Figure 5 is a fragmentary sectional view of the lower portion of the cylinder receiving said piston showing a ported fitting carried by the lower cylinder head, and a provision upon the top portion of said fitting for retaining a valve member in the fitting without materially restricting the flow of air through said fitting.

In these views, the reference character 1 designates a cylinder having upper and lower heads 2 and 3 suitably screw-threaded upon said cylinder. The upper head 2 rigidly carries a spherical extension 4 adapted to be universally joined to an anchorage member (not shown), which may be carried by a vehicle body.

The lower head 3 carries a central packed bearing 5 through which slides a piston rod 6, the upper end portion of which is reduced as indicated at 7 for engagement by a composite piston.

This piston comprises a disk 8, preferably metallic, slidable upon the end portion 7 of the piston rod and formed with an annular shoulder 8$^a$ between its inner portion and its relatively reduced outer portion. A pair of annular cup leathers (or the like) 9 engage the reduced portion of the disk 8 respectively above and below said disk, said leathers surrounding the shoulders 7$^a$. As is common practice, the leathers 9 are marginally flanged respectively upwardly and downwardly to bear upon the inner face of the cylinder 1. Said leathers are held in place against the disk 8 by metal clamping plates 11, rivets 12 being passed through said plates, and through the leathers 9 and disk 8 to hold the assembly together.

13 designates a pair of spring rings of angular cross section which are fitted within the marginal flanges of the leathers 9 and which are split as indicated at 13$^a$ to permit them to expand freely against said flanges to maintain a proper seal between the leathers and the cylinder 1. The rings 13 are retained in their positions of use by engagement of their inner marginal portions between offset marginal portions 14 of the plates 11 and the leathers 9. The margins 14 are offset to a sufficient extent from the main portions of the plates 11 to afford the rings 13 a free movement radially.

15 designates a pair of oppositely bowed leaf springs which are centrally apertured to receive the reduced portion 7 of the piston rod respectively adjacent to a nut 16 upon the upper end of said rod and to the shoulder 7$^a$ formed between the main body of said rod and its reduced portion 7. Said springs terminally bear upon the plates 11 and coact in a tendency to hold the piston central with respect to the length of the reduced portion 7. It is evident, however, that by overcoming one or the other of said springs 15, the piston is free to float up or down upon the portion 7 of the piston rod to a limited extent.

17 designates a port extending through the central portion of the disk 8 between its top and bottom surfaces and 18 is a ball valve retained within said disk and adapted to seat upwardly to close said port, as Figure 1 clearly shows. The ball may be retained in the opening 17 by any suitable means as for example by slightly upsetting the metal as spaced points around the lower ends of said opening after the ball is in place. In the lower head 3 of the cylinder there is mounted a fitting 19, formed with a port 20 opening from the atmosphere into the cylinder and controlled by a ball valve 21 retained within said fitting and adapted to seat downwardly to close said port.

22 designates an anchorage member which may be connected to a vehicle axle, (not shown) and which engages with a spherical head 23 for engagement by said anchorage member. A cylindrical retainer 24 receives said head and fits into a socket 25 in the anchorage member 22. Said retainer has a closed rounded end portion interiorly bearing against one side of said head, and is slotted lengthwise, as indicated at 26, to accommodate the piston rod as said head is being inserted in the retainer. The other side of the head 23 is engaged by the concaved end wall 27 of a cylindrical sheet metal bearing member 28, within which a coiled spring 29 is compressed between the end 27 of said bearing member and a ring 30 secured within the inner end of the retainer 24 by a cotter pin 31, which also secures said retainer within the socket 25 of the anchorage member.

In the operation of the disclosed stabilizer, the composite piston, under normal conditions, will be substantially midway between the cylinder heads. When the vehicle (not shown) equipped with said stabilizer, is subjected to a shock, such as to compress the body supporting springs (not shown), the piston 8 assumes for example the upper position indicated in dash lines in Fig. 1. During this travel of the piston to its raised position, the air in the cylinder 1 above the piston escapes to the lower portion of the cylinder through the piston port 17 but is sufficiently retarded by said port (owing to the restricted nature of the latter) to cause a certain amount of compression of air above the piston during its upward travel and a resultant cushioning action of such air.

Immediately after any such upward travel of the piston relative to the cylinder, the rebound of the vehicle springs (not shown) tends to raise the vehicle body (not shown) more or less violently and there results a travel of the piston relative to the cylinder to a lowered position, as for example, the lowermost position shown in dash line in Fig. 1. Primarily, it is the purpose of the stabilizer to moderate this rebound, and this result is accomplished, first through compression of air beneath the downwardly traveling piston and second, by the vacuum effect produced in the upper portion of the cylinder by such downward travel. It will be apparent, that while the piston is moving downwardly, the resulting air compression in the lower portion of the cylinder and vacuum effect above the piston tend to seat both of the ball valves 18 and 21 so that the air beneath the piston cannot escape either to the upper part of the cylinder or to the atmosphere. Thus the vehicle springs are restrained from acting freely and violently upon the vehicle body during their rebound and there is avoided the resultant discomfort to the occupants of the vehicle and strain upon said vehicle springs and body structure.

The disclosed universal joint connection between the piston rod 6 and its anchorage rod member 22, is advantageous primarily in that the ball head 23 is always firmly engaged between the rounded end of the retainer 24 and the spring pressed bearing member 28 so that there can be no rattle. Furthermore, the disclosed construction lends itself to a rapid assembly since the proper relation between the head 23, the retainer 24, the spring 29 and the ring 30 may be quickly established and this assembly may then be engaged as a unit in the socket 25 of the anchorage member 22, and secured therein by the cotter pin 31.

By allowing the rod 6 a slight lengthwise play through the piston, which play is resisted by the springs 15, slight relative movements of the cylinder 1 and rod 6 are taken care of by such play and are cushioned by said springs 15, without entailing sliding of the piston with respect to the cylinder. This avoids necessity of the piston responding to frequently recurring slight vibrations and thus being subjected to almost continuous wear during travel of a vehicle. Also it is advantageous, even when the relative movement of the cylinder 1 and rod 6 is considerable, to provide for an initial cushioned movement of said rod, independent of the piston, since a smoother action of the device is thus obtained, the inertia of the piston being more readily overcome.

It is a feature of the disclosed construction that the necessary compression of air for cushioning purposes is effected automatically and without necessity for any air compression apparatus.

What I claim is:

1. In a device of the character described, the combination with a cylinder and a single piston reciprocatory in said cylinder formed with a port opening from side to side of said piston, a rod connected to said piston and slidable through one end of the cylinder, a downwardly seating check valve controlling the in-flow of air to the lower end of the cylinder, and an upwardly seating check valve carried by said piston and controlling the flow of air through said port.

2. In a device of the character described, a cylinder having substantially closed ends, a rod entering said cylinder, a piston within the cylinder engaging said rod and adapted for a limited sliding travel relative to the rod, and bow springs centrally mounted upon the rod at opposite sides of the piston and terminally bearing upon the piston, yieldably resisting relative sliding of piston and rod, in either direction.

3. In a device of the character described, the comibnation with a cylinder comprising a ported head at one end and an unported head at the other, a rod slidable through said ported head, a single piston carried by said rod within the cylinder, said piston having a port adapted to connect the two spaces into which the cylinder is divided by said piston, a check valve controlling the cylinder head port adapted to seat responsive to superatmospheric pressure in the end portion of the cylinder adjacent to the ported cylinder head, and a check valve controlling said piston port also adapted to seat responsive to superatmospheric pressure in said end portion of the cylinder.

4. In a device of the character described, the combination with a cylinder having headed ends. and formed with a port in one of its heads, a rod slidable through one of said heads, a single piston carried by said rod within the cylinder, and dividing the cylinder into two air spaces, and formed with a port adapted to connect said air spaces, a check valve controlling the cylinder head port seating responsive to superatmospheric pressure in the air space between the piston and the ported head, and a check valve controlling the piston port also seating responsive to superatmospheric pressure in the last named air space.

5. In a device of the character described, the combination with a cylinder having closed ends, of a unit reciprocatory in said cylinder, comprising a piston and a rod connected to said piston and slidable through one end of the cylinder, said unit being formed with a port opening from one side of said piston to the other, a check valve controlling said port and adapted to seat toward one end of the cylinder, the opposite end of the cylinder being formed with a port and a check valve controlling said port and adapted to seat away from the piston.

6. In a device of the character described, the combination with a cylinder having headed ends and formed with a port in one of its heads, the other cylinder head being unported, of a unit reciprocatory in said cylinder comprising a piston and a rod connected to said piston and slidable through the ported cylinder head, said unit being formed with a port opening from one side of the piston to the other, a check valve controlling the last named port adapted to seat responsive to super-atmospheric pressure in the space between the piston and the ported head, and a check valve controlling the port of the ported head also adapted to seat responsive to super-atmospheric pressure in the space between the piston and the ported head.

7. In a device of the character described the combination with a cylinder having headed ends and formed with a port in one of its heads, of a unit reciprocatory in said cylinder comprising a piston and a rod connected to said piston and slidable through one of said heads, said unit being formed with a port extending from one side of said piston to the other side thereof, a check valve controlling the port of said unit and adapted to seat and responsive to super-atmospheric pressure in the space between the piston and the ported head, and a check valve controlling the port of the ported head and adapted also to seat responsive to super-atmospheric pressure between the piston and the ported head.

In testimony whereof I sign this specification.

J. HARRY HARLEY.